United States Patent
Takeda et al.

(10) Patent No.: US 12,041,619 B2
(45) Date of Patent: Jul. 16, 2024

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 104 days.

(21) Appl. No.: 16/961,136

(22) PCT Filed: Jan. 11, 2018

(86) PCT No.: PCT/JP2018/000550
§ 371 (c)(1),
(2) Date: Jul. 9, 2020

(87) PCT Pub. No.: WO2019/138524
PCT Pub. Date: Jul. 18, 2019

(65) Prior Publication Data
US 2020/0374912 A1 Nov. 26, 2020

(51) Int. Cl.
*H04W 72/23* (2023.01)
*H04L 5/00* (2006.01)
*H04W 72/0446* (2023.01)

(52) U.S. Cl.
CPC .......... *H04W 72/23* (2023.01); *H04L 5/0055* (2013.01); *H04W 72/0446* (2013.01)

(58) Field of Classification Search
CPC .......... H04W 72/1289; H04W 72/042; H04W 72/0446; H04L 5/0055; H04L 1/1812; H04L 1/1861; H04L 1/1896; H04L 1/1854

(Continued)

(56) References Cited

U.S. PATENT DOCUMENTS

| | | | |
|---|---|---|---|
| 2016/0020891 A1 | 1/2016 | Jung et al. | |
| 2017/0273056 A1* | 9/2017 | Papasakellariou | H04W 52/143 |
| 2018/0219649 A1* | 8/2018 | Ying | H04L 1/1819 |
| 2018/0262316 A1* | 9/2018 | Wang | H04L 1/1861 |

(Continued)

FOREIGN PATENT DOCUMENTS

| | | |
|---|---|---|
| CN | 107113122 A | 8/2017 |
| WO | 2017218749 A1 | 12/2017 |

OTHER PUBLICATIONS

Ericsson, "On PUCCH resource allocation", R1-1703296, Feb. 13-17, 2017 (Year: 2017).*

(Continued)

*Primary Examiner* — Mang Hang Yeung
(74) *Attorney, Agent, or Firm* — Osha Bergman Watanabe & Burton LLP

(57) ABSTRACT

To properly control UL transmissions of A/N in response to a plurality of DL transmissions with different requirements and the like, one aspect of a user terminal in the present disclosure has a transmitting section that transmits a first delivery acknowledgement signal (A/N) in response to a first PDSCH and a second A/N in response to a second PDSCH transmitted later than the first PDSCH, and a control section that controls to transmit at least one of the first A/N and the second A/N, using one of an uplink control channel configured for the first A/N and another uplink control channel configured for the second A/N, in a case where transmission timing of the first A/N overlaps transmission timing of the second A/N.

4 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2018/0310257 | A1* | 10/2018 | Papasakellariou | .... H04W 52/50 |
| 2019/0173622 | A1 | 6/2019 | Xiong et al. | |
| 2019/0386785 | A1 | 12/2019 | Zhou | |
| 2020/0137751 | A1* | 4/2020 | Nam | .................. H04W 74/006 |
| 2020/0154467 | A1* | 5/2020 | Gong | ..................... H04L 1/189 |
| 2020/0213058 | A1* | 7/2020 | Choi | ...................... H04B 7/088 |

OTHER PUBLICATIONS

International Search Report issued in PCT/JP2018/000550 mailed on Apr. 3, 2018 (1 page).

Written Opinion of the International Searching Authority issued in PCT/JP2018/000550 mailed on Apr. 3, 2018 (4 pages).

ETRI.; "UCI multiplexing of different usage scenario"; 3GPP TSG RAN WG1 Meeting 91, R1-1720226; Reno, USA; Nov. 27-Dec. 1, 2017 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG RAN WG1 Meeting #88; R1-1701648 "Resource indication of UL control channel" Huawei, HiSilicon; Athens, Greece; Feb. 13-17, 2017 (5 pages).

3GPP TSG RAN WG1 Meeting #91; R1-1719413 "Discussion on UCI feedback for URLLC" Huawei, HiSilicon; Reno, USA; Nov. 27-Dec. 1, 2017 (6 pages).

Extended European Search Report issued in European Application No. 18899208.5, dated Nov. 9, 2021 (16 pages).

Office Action issued in the counterpart Indian Patent Application No. 202037033139, mailed on Jun. 29, 2022 (6 pages).

Notice of Reasons for Refusal issued in Japanese Application No. 2019-564228 mailed on Oct. 25, 2022 (6 pages).

3GPP TS 38.213 V15.0.0, "3rd Generation Partnership Project; Technical Specification Group Radio Access Network; NR; pysical layer procedures for control (Release 15)" Dec. 2017 (56 pages).

Office Action issued in the counterpart European Patent Application No. 18899208.5, mailed on Aug. 23, 2023 (10 pages).

* cited by examiner

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE, successor systems (e.g., also referred to as LTE-A (LTE-Advanced), FRA (Future Radio Access), 4G, 5G, 5G+ (plus), NR (New RAT), LTE Rel. 14, 15~, etc.) to LTE have also been studied.

Further, in the existing LTE system (e.g., LTE Rel. 8-13), using a subframe of 1 ms as a transmission period (scheduling period) of one or more transport blocks (TB: Transport Block), communication on downlink (DL) and/or uplink (UL) is performed. For example, in the case of Normal Cyclic Prefix (NCP), the subframe is comprised of 14 symbols with subcarrier spacing of 15 kHz. The subframe is also called a transmission time interval (TTI: Transmission Time Interval) and the like.

Furthermore, in the existing LTE system, using downlink control information (DCI: Downlink Control Information), scheduled is a UL data channel (e.g., PUSCH: Physical Uplink Shared Channel, also referred to as UL shared channel, etc.) of predetermined timing (e.g., from 4 ms later after the DCI, also referred as scheduling timing, PUSCH timing or the like). UL data is transmitted using the UL data channel.

Still furthermore, in the existing LTE system, a user terminal transmits uplink control information (UCI: Uplink Control Information) to a radio base station. The UCI includes at least one of receipt conformation information (e.g., also referred to as ACK or NACK (Acknowledge or Negative ACK), A/N, HARQ (Hybrid Automatic Repeat reQuest-ACK, etc.) in response to a DL data channel (e.g., PDSCH: Physical Downlink Shared Channel, also referred to as DL shared channel, etc.), channel state information (CSI: Channel State Information), and scheduling request (SR: Scheduling Request). The UCI is transmitted using a UL control channel (e.g., PUCCH: Physical Uplink Control Channel) or the above-mentioned UL data channel.

PRIOR ART DOCUMENT

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

DISCLOSURE OF INVENTION

Problems to be Solved by the Invention

In future radio communication systems (e.g., 5G or NR), a plurality of use cases is expected with different requirements such as high speed and high capacity (e.g., eMBB: enhanced Mobile Broad Band), massive terminals (e.g., massive MTC (Machine Type Communication)), and ultra-high reliability and low latency (e.g., URLLC (Ultra Reliable and Low Latency Communications)). In addition, names of these use cases are not limited to the aforementioned names. For example, URLLC may be called Critical MTC, Ultra-reliable MTC, Mission Critical Communications and the like.

In such a future radio communication system, it is expected that a plurality of DL signals (e.g., PDSCHs) with different requirements is transmitted to a user terminal. The user terminal transmits a delivery acknowledgement signal (also called HARQ-ACK, A/N, etc.) in response to PDSCH transmission as feedback, and there is also the risk that feedback timings of A/N in response to PDSCHs with different reception timings overlap one another.

Accordingly, in the future radio communication system, it is desired to properly control UL transmissions of A/N in response to a plurality of DL transmissions with different requirements and the like.

In the present disclosure, it is an object to provide a user terminal and radio communication method capable of properly controlling UL transmissions of A/N in response to a plurality of DL transmissions with different requirements and the like.

Means for Solving the Problem

One aspect of a user terminal in the present disclosure is characterized by having a transmitting section that transmits a first delivery acknowledgement signal (receipt confirmation signal) (A/N) in response to a first PDSCH and a second A/N in response to a second PDSCH transmitted later than the first PDSCH, and a control section that controls to transmit at least one of the first A/N and the second A/N, using one of an uplink control channel configured for the first A/N and another uplink control channel configured for the second A/N, in the case where transmission timing of the first A/N overlaps transmission timing of the second A/N.

Advantageous Effect of the Invention

According to the present invention, it is possible to properly control UL transmissions of A/N in response to a plurality of DL transmissions with different requirements and the like.

BEST MODE FOR CARRYING OUT THE INVENTION

In the future radio communication system (e.g., 5G or NR), for example, a plurality of use cases (traffic types) is expected with different requirements such as eMBB, URLLC and massive MTC. For example, in eMBB, at least one of higher performance, higher efficiency and higher capacity than URLLC is required. On the other hand, in URLLC, higher reliability and/or lower latency than eMBB is required.

In such a future radio communication system, it is expected that a plurality of items of DL data (e.g., DL data for eMBB and DL data for URLLC) with different requirements is transmitted to the same user terminal. The user terminal transmits a delivery acknowledgement signal (receipt confirmation signal) (also called HARQ-ACK, A/N, etc.) in response to the received DL data (PDSCH) as feedback. Therefore, it is expected to control feedback of A/N so as to meet respective predetermined requirements also for a plurality of items of DL data with different requirements.

Further, in the future radio communication system, it is supported to configure a plurality of allocation periods of an uplink control channel (PUCCH) used in transmission of uplink control information (UCI) such as A/N. For example, as the period of the PUCCH, it is possible to apply one symbol, two symbols, four symbols, . . . , one slot, two slots, . . . , eight slots and the like.

Furthermore, in the future radio communication system, it is supported to configure a plurality of allocation periods of a downlink shared channel (PDSCH) used in transmission of DL data and the like. By this means, it is possible to flexibly configure periods of the PDSCH corresponding to the traffic type.

For example, in eMBB, as compared with the other traffic types (e.g., URLLC), the period of a PDSCH is increased, and A/N feedback timing in response to the PDSCH is delayed. On the other hand, in URLLC, as compared with the other traffic types (e.g., eMBB), the period of a PDSCH is shortened, and A/N feedback timing in response to the PDSCH is shortened.

Figure 1:
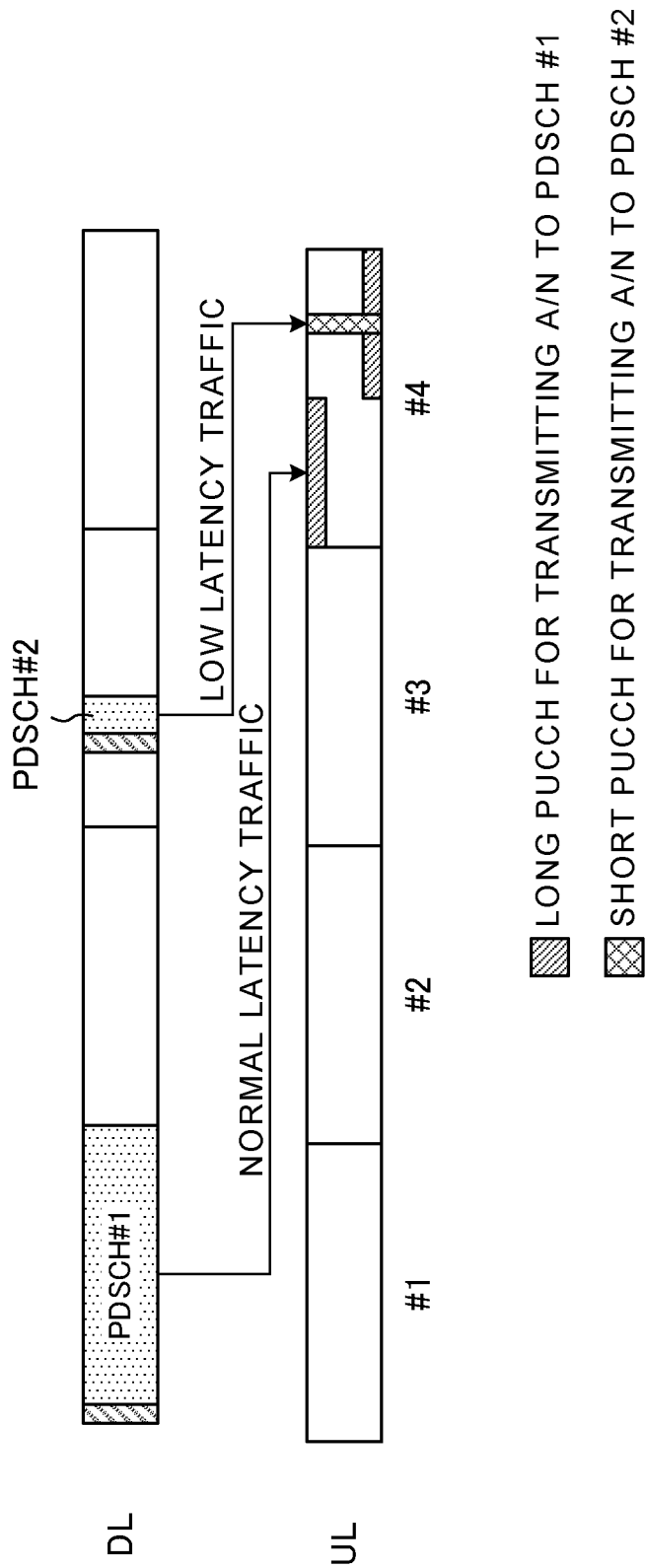
FIG. 1 is a diagram to explain the case where transmission timings of A/N in response to PDSCHs with different transmission timings overlap each other.

Thus, in the case of controlling transmission of a PDSCH and A/N feedback timing in response to the PDSCH based on the traffic type, there is the risk that feedback timings of A/N in response to PDSCHs with different requirements overlap one another (see FIG. 1).

FIG. 1 illustrates the case where PDSCHs with different traffic types are transmitted to a UE at different timings (e.g., slots), and feedback timings of A/N in response to respective PDSCHs overlap each other. Normal latency traffic in FIG. 1 corresponds to eMBB, and low latency traffic corresponds to URLLC, but the present invention is not limited thereto.

Specifically, an example is shown where A/N in response to PDSCH #1 transmitted in a predetermined time interval (e.g., slot #1) is transmitted on a PUCCH (long PUCCH) of slot #4, and A/N in response to PDSCH #2 transmitted in a slot #3 (or, mini-slot contained in the slot #3) is transmitted on a PUCCH (short PUCCH) of slot #4. The transmission timing of A/N in response to the PDSCH may be notified to the UE from the base station (scheduled by the downlink control information), or may be configured so that the timing is determined based on a predetermined condition.

Thus, in the case where the transmission timing of A/N (or, long PUCCH) in response to PDSCH #1 overlaps the transmission timing of A/N (or, short PUCCH) in response to PDSCH #2 transmitted at timing later than the PDSCH #1, it becomes the problem how to control A/N transmission.

The inventors of the present invention studied methods of properly controlling transmissions of A/N in response to a plurality of items of DL data with different requirements, and arrived at the present invention. For example, in the case where transmission timing of first A/N in response to a first PDSCH (scheduled by a first downlink control information) overlaps (or, collides with) transmission timing of a second A/N in response to a second PDSCH (scheduled by a second downlink control information) transmitted later than the first PDSCH, the inventors conceived controlling to transmit at least one of the first A/N and the second A/N, using one of a PUCCH configured for the first A/N and another PUCCH configured for the second A/N (for example, the first A/N and the second A/N are transmitted by a same uplink control channel). A reception timing of the second downlink control information precedes a predetermined time from a transmission timing of the first delivery acknowledgment signal.

One Embodiment of the present invention will be described below in detail with reference to drawings. In addition, in this Embodiment, for example, a data channel (PDSCH #1) controlled based on a first requirement corresponds to a PDSCH for eMBB. Further, for example, a data channel (PDSCH #2) controlled based on a second requirement corresponds to a PDSCH for URLLC. As a matter of course, applicable traffic types are not limited thereto.

Further, in the following description, the first and second requirements will be illustrated, but the requirements are not limited to two, and the present invention is applicable as appropriate to transmission control of a plurality of items of DL data with three or more requirements and/or A/N in response to the DL data. Furthermore, a plurality of items of DL data with different requirements and/or A/N in response to the DL data may be transmitted in different periods (e.g., slot and mini-slot, or the different numbers of symbols), or may be transmitted in the same period (e.g., mini-slot, or the same number of symbols).

Moreover, in the following description, the case where transmission timings of A/N overlap one another will be descried as an example, and this Embodiment is applicable to transmission other than A/N. For example, this Embodiment may be applied to at least one of a scheduling request (SR) and channel state information (CSI) which is transmitted using a PUCCH. Further, this Embodiment may be applied to a sounding reference signal (SRS). In this case, a PDSCH is read with downlink control information for a CSI trigger or downlink control information for an SRS trigger, and A/N is read with CSI or SRS.

(Aspect 1)

In Aspect 1, control is performed so as to preferentially perform transmission of A/N in response to a PDSCH transmitted later in the time domain.

Figure 2:
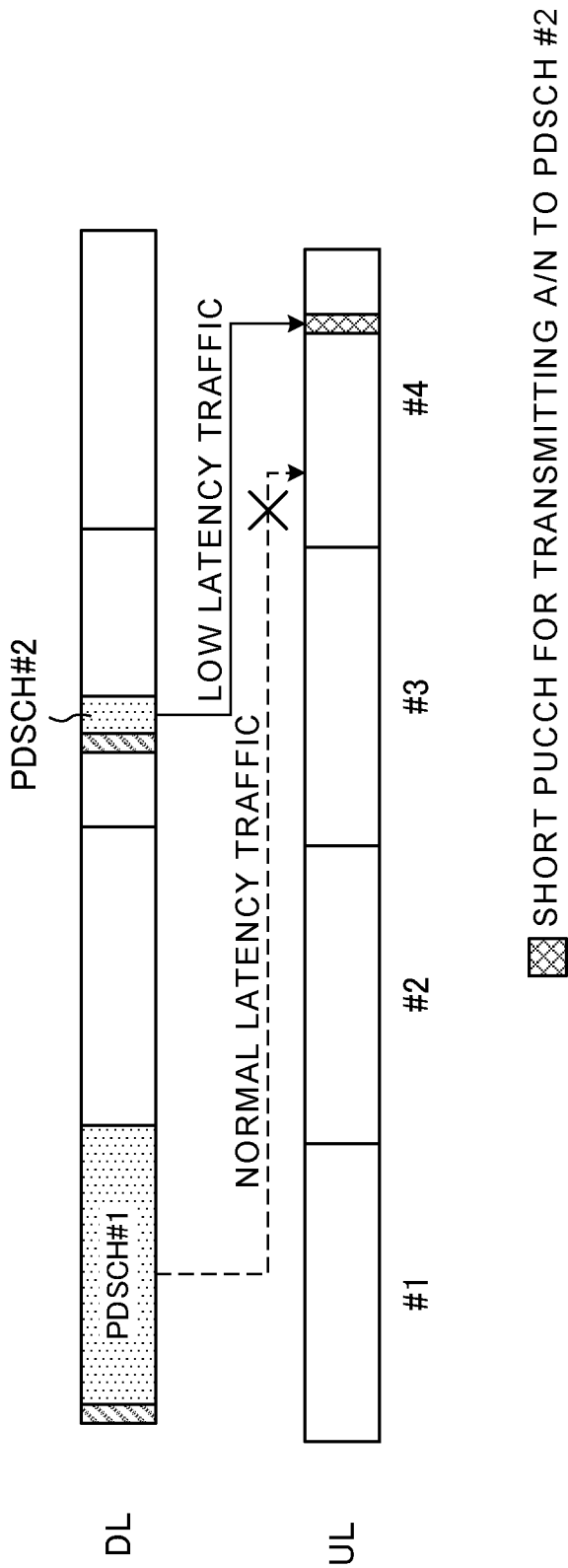
FIG. 2 is a diagram showing one example of A/N transmission control according to Aspect 1.

FIG. 2 shows one example of transmission control of A/N in Aspect 1. In FIG. 2, in the case where transmission timing of first A/N in response to PDSCH #1 transmitted in a predetermined time interval (e.g., slot #1) overlaps transmission timing of second A/N in response to PDSCH #2 transmitted in a slot #3, the second A/N is preferentially transmitted.

Transmission timing of first A/N and/or transmission timing of second A/N may be notified from the base station to the UE (scheduled by a first downlink control information and a second downlink control information), or may be determined based on a predetermined condition. In the case where the base station notifies the UE, the base station may include information for indicating transmission timing of A/N in response to PDSCH #1 in downlink control information (DCI) for scheduling the PDSCH #1. Similarly, the base station may include information for indicating transmission timing of A/N in response to PDSCH #2 in downlink control information (DCI) for scheduling the PDSCH #2.

In the case where transmission timings of A/N overlap each other, the UE gives a higher priority to second A/N transmission indicated at later timing (slot #3 in FIG. 2) than first A/N transmission indicated early. For example, the UE transmits the second A/N using a PUCCH configured for the second A/N, and controls not to transmit (e.g., drop) the first A/N.

Further, the UE may drop (or, abandon) the first A/N indicated at early timing, before starting second A/N transmission indicated at later timing. By this means, it is possible to accurately transmit the A/N of the second PDSCH (PDSCH #2) with a high possibility of low latency service at indicated timing.

As shown in FIG. 2, by giving a higher priority to A/N (or, later indicated A/N) transmission in response to the PDSCH transmitted later, it is possible to preferentially perform transmission of the low latency traffic type.

(Aspect 2)

In Aspect 2, control is performed so as to perform transmission, preferentially using a PUCCH configured for A/N in response to a PDSCH transmitted later in the time domain.

Figure 3:
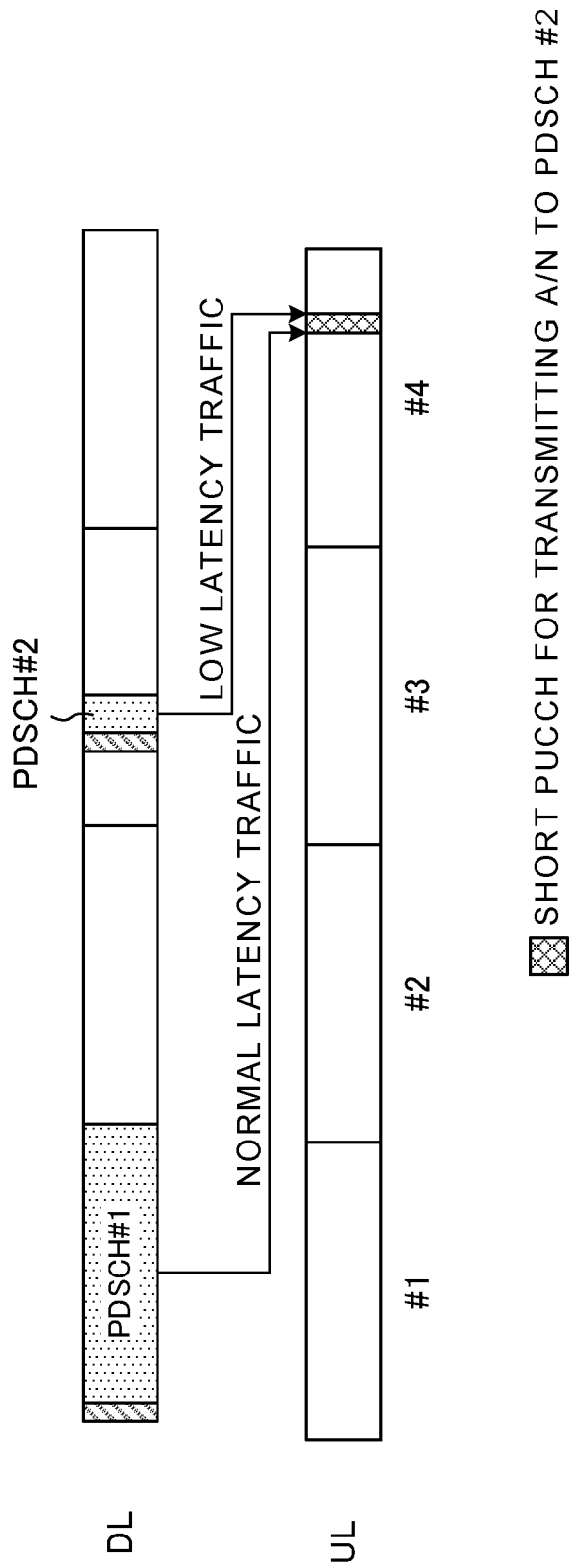
FIG. 3 is a diagram showing one example of A/N transmission control according to Aspect 2.

FIG. 3 shows one example of transmission control of A/N in Aspect 2. In FIG. 3, in the case where transmission timing of first A/N in response to PDSCH #1 transmitted in a predetermined time interval (e.g., slot #1) overlaps transmission timing of second A/N in response to PDSCH #2 transmitted in a slot #3, a PUCCH (e.g., short PUCCH) configured for the second A/N is preferentially applied.

In the case where transmission timings of A/N overlap each other, the UE gives a higher priority to the PUCCH for second A/N transmission indicated at later timing (slot #3 in FIG. 3) than the PUCCH for first A/N transmission indicated early to apply. For example, the UE transmits the second A/N and first A/N, using the PUCCH configured for the second A/N.

In this case, the UE may re-multiplex (mapping) the first A/N indicated early into the PUCCH for the second A/N indicated later to perform first A/N transmission. By this means, it is possible to transmit both the first A/N and the second A/N transmission timings of which overlap. In addition, the first A/N and second A/N may be multiplexed (mapping) separately, or may be collectively multiplexed (mapping) (e.g., joint coding).

(Aspect 3)

In Aspect 3, control is performed so as to preferentially perform transmission of A/N in response to a PDSCH transmitted early in the time domain.

Figure 4:
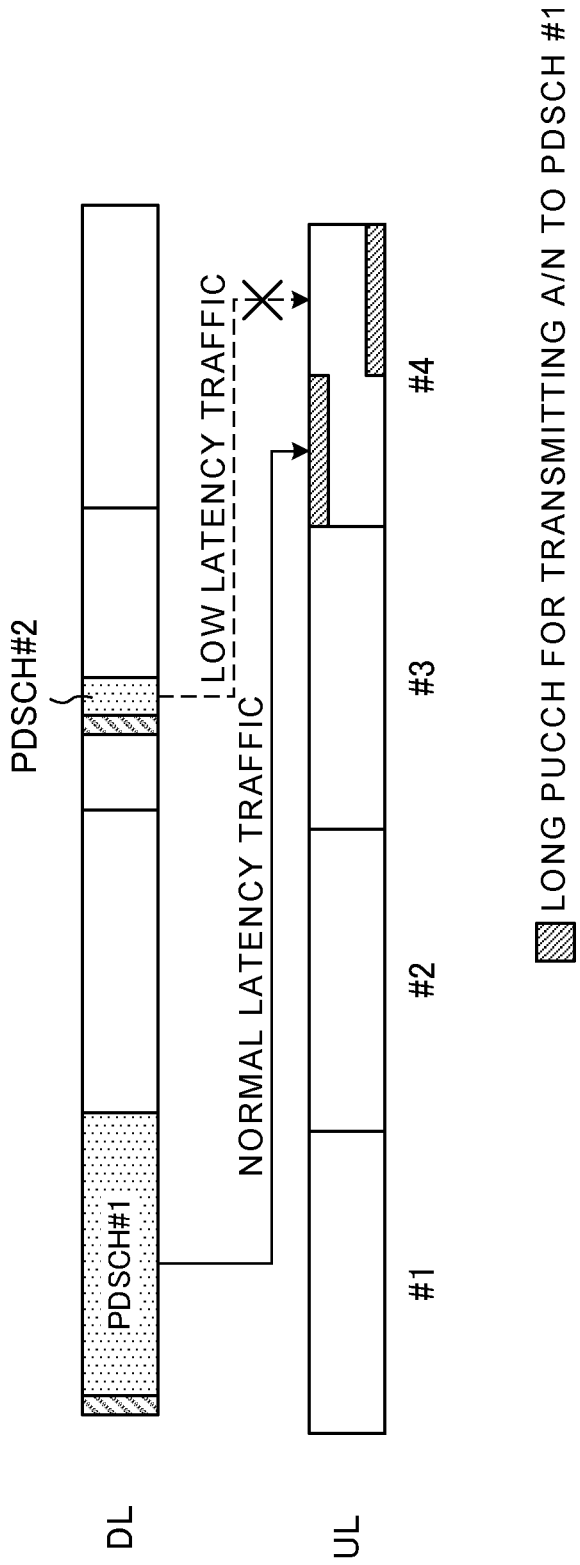
FIG. 4 is a diagram showing one example of A/N transmission control according to Aspect 3.

FIG. 4 shows one example of transmission control of A/N in Aspect 3. In FIG. 4, in the case where transmission timing of first A/N in response to PDSCH #1 transmitted in a predetermined time interval (e.g., slot #1) overlaps transmission timing of second A/N in response to PDSCH #2 transmitted in a slot #3, the first A/N is preferentially transmitted.

Transmission timing of first A/N and/or transmission timing of second A/N may be notified from the base station to the UE (scheduled by a first downlink control information and a second downlink control information), or may be determined based on a predetermined condition.

In the case where transmission timings of A/N overlap each other, the UE gives a higher priority to first A/N transmission indicated at early timing (slot #1 in FIG. 2) than second A/N transmission indicated at later timing (slot #3 in FIG. 4). For example, the UE transmits the first A/N using a PUCCH configured for the first A/N, and controls not to transmit (e.g., drop) the second A/N.

In addition, the UE may perform transmission except A/N (HARQ-ACK less transmission) for low latency traffic (Low-latency or URLLC traffic). For example, in the low latency traffic, in the case where UL transmission (e.g., UL data transmission) except A/N transmission exists in a slot #4, the UL data transmission may be performed. In such a case, the second A/N may be multiplexed (mapped) into the UL data (UCI on PUSCH) and transmitted.

As shown in FIG. 4, by giving a higher priority to A/N (or, early indicated A/N) transmission in response to the PDSCH transmitted early, it is possible to perform transmission, without changing the multiplexing processing on the early indicated A/N. By this means, it is possible to prevent the load of UL transmission processing on the UE from increasing. In addition, in the case where A/N transmission indicated later overlaps A/N transmission indicated early, it may be configured that the multiplexing processing of A/N indicated later is not performed.

In a slot #4, in the case where anther UL transmission (e.g., PUSCH transmission) is scheduled in a part or the whole of the period, the UE may control not to perform (e.g., drop) first A/N transmission. In this case, the UE is capable of performing transmission continuously, without changing another UL transmission already scheduled.

Further, in the case of not performing first A/N feedback, the UE may receive a PDSCH that is transmitted without responding to the first A/N feedback (irrespective of the first A/N feedback). By this means, also in the case where the UE is not capable of performing the first A/N feedback (and, the case where the first A/N is NACK), the UE is capable of receiving retransmission data.

In the case of indicating transmission of first A/N at UL timing at which another UL transmission is scheduled, the base station may expect that the UE does not perform first A/N feedback.

Further, with respect to a PDSCH (e.g., PDSCH #1 without feedback of first A/N) without feedback of A/N, the base station may expect that the PDSCH is correctly received in the UE, and control retransmission and/or new data transmission.

Alternatively, with respect to a PDSCH (e.g., PDSCH #1 without feedback of first A/N) without feedback of A/N, the base station may expect that the PDSCH is not correctly received in the UE, and control retransmission and/or new data transmission. For example, with respect to the PDSCH without feedback of A/N, the base station may control to retransmit the same transport block (TB). In addition, retransmission may be configured so that another PDSCH is transmitted at other timing. Further, at the time of retransmission, the station may apply redundancy version (RV), modulation coding index (MCS), the number of allocation resources (RB) and the like which are different from the last time.

(Radio Communication System)

A configuration of a radio communication system according to one Embodiment of the present invention will be described below. In the radio communication system, communication is performed by using any of the radio communication methods according to above-mentioned each Embodiment of the invention or combination thereof.

Figure 5:
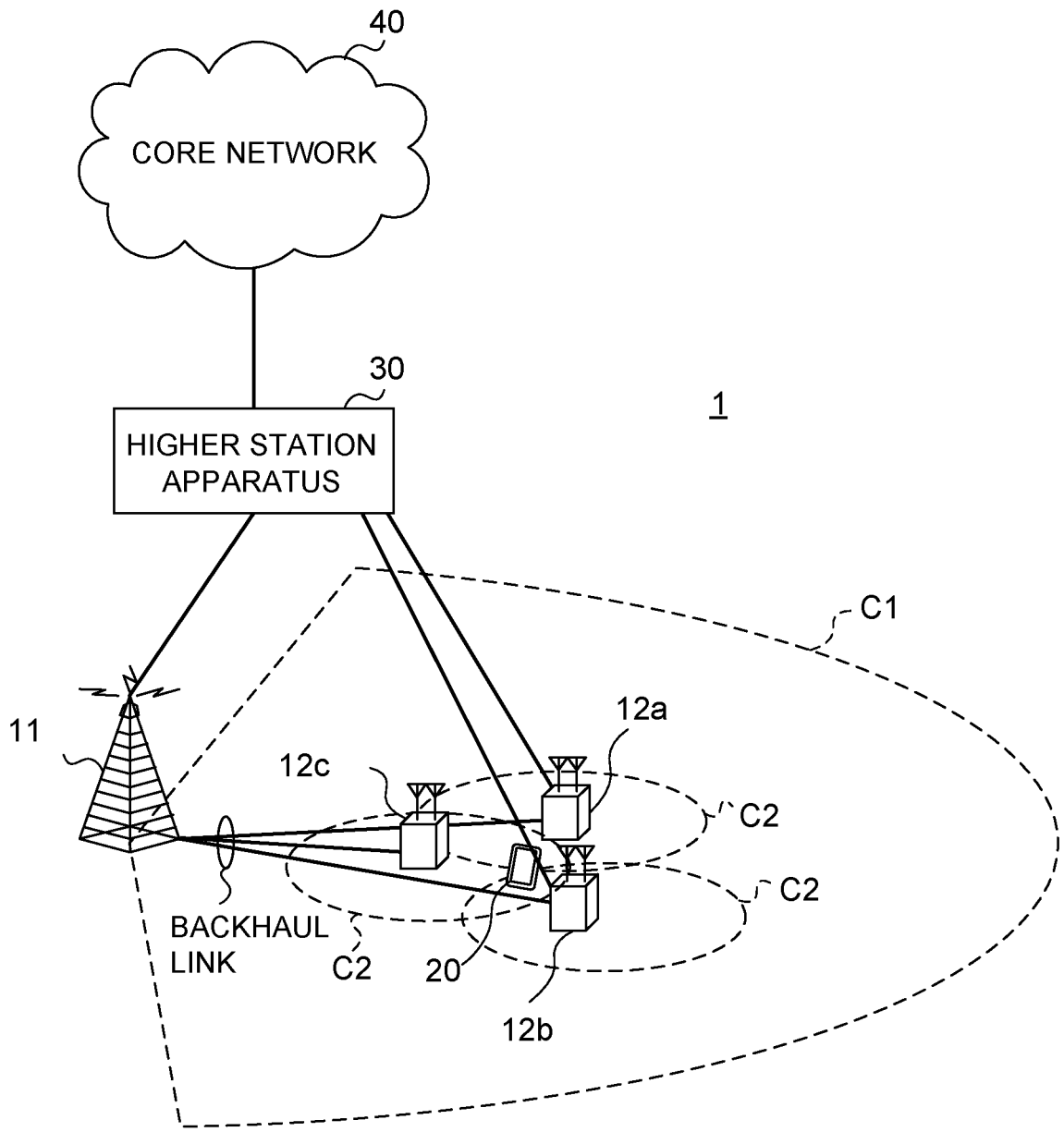
FIG. 5 is a diagram showing one example of a schematic configuration of a radio communication system according to this Embodiment.

FIG. 5 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology) and the like, or may be called the system to actualize each system described above.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2. The arrangement, numbers and the like of each cell and user terminal 20 are not limited to the aspect shown in the figure.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g., 5 CCs or less, 6 CCs or more).

The user terminal 20 and radio base station 11 are capable of communicating with each other using carriers (also called the existing carrier, legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, etc.), or may use the same carrier as in the radio base station 11. In addition, the configuration of the frequency band used in each radio base station is not limited thereto.

Further, in each cell, the user terminal 20 is capable of performing communication using Time Division Duplex (TDD) and/or Frequency Division Duplex (FDD). Furthermore, in each cell (carrier), single numerology may be applied, or a plurality of different types of numerology may be applied.

The radio base station 11 and radio base station 12 (or, two radio base stations 12) may be connected by cable (e.g., optical fiber in conformity with CPRI (Common Public Radio Interface), X2 interface, etc.), or radio.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier Frequency Division Multiple Access (SC-FDMA) and/or OFDMA is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel) and the like. The downlink control information (DCI) including scheduling information of the PDSCH and/or PUSCH and the like is transmitted on the PDCCH.

In addition, scheduling information may be notified by DCI. For example, DCI for scheduling DL data reception may be called a DL assignment, and DCI for scheduling UL data transmission may be called a UL grant.

The number of OFDM symbols used in the PDCCH is transmitted on the PCFICH. Delivery acknowledgement signal (Receipt confirmation signal, Receipt confirmation information) (e.g., also referred to as retransmission control information, HARQ-ACK, ACK/NACK, etc.) of HARQ (Hybrid Automatic Repeat reQuest) for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data, higher layer control information and the like is transmitted on the PUSCH. Further, radio quality information (CQI: Channel Quality Indicator) of downlink, delivery acknowledgement signal, scheduling request (SR) and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information-Reference Signal (CSI-RS), Demodulation Reference Signal (DMRS: DeModulation Reference Signal), Positioning Reference Signal (PRS) and the like. Further, as uplink reference signals, in the radio communication system 1 are transmitted Sounding Reference Signal (SRS), Demodulation Reference Signal (DMRS) and the like. In addition, the DMRS may be called UE-specific Reference Signal. Further, the transmitted reference signals are not limited thereto.

(Radio Base Station)

Figure 6:
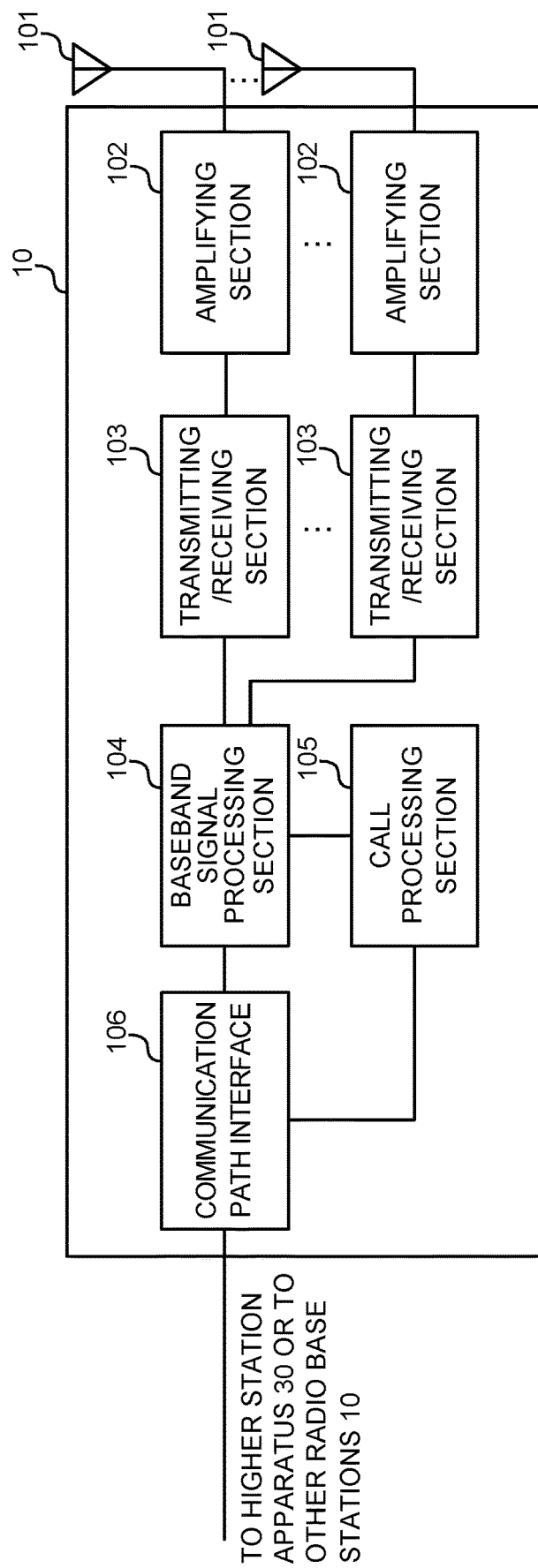
FIG. 6 is a diagram showing one example of an entire configuration of a radio base station according to this Embodiment.

FIG. 6 is a diagram showing one example of an entire configuration of the radio base station according to one Embodiment of the present invention. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101. The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for uplink signals, radio-frequency signals received in the transmitting/receiving antennas 101 are amplified in the amplifying sections 102. The transmitting/receiving section 103 receives the uplink signal amplified in the amplifying section 102. The transmitting/receiving section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing (configuration, release and the like) of a communication channel, state management of the radio base station 10, management of radio resources and the like.

The communication path interface 106 transmits and receives signals to/from the higher station apparatus 30 via a predetermined interface. Further, the communication path interface 106 may transmit and receive signals (backhaul signaling) to/from another radio base station 10 via an inter-base station interface (e.g., optical fiber in conformity with CPRI (Common Public Radio Interface), X2 interface).

The transmitting/receiving section 103 transmits a DL signal (e.g., downlink control information including a UL transmission instruction (e.g., UL grant) and/or HARQ-ACK transmission instruction, downlink data, etc.). The transmitting/receiving section 103 receives a UL channel scheduled (or, assigned) a first period later after receiving the DL signal, and predetermined information (e.g., PHR and/or CSI, etc.) transmitted on the UL channel.

The transmitting/receiving section 103 transmits a plurality of items of DL data (PDSCHs) with different traffic types (e.g., latency allowable levels of traffic). Further, the transmitting/receiving section 103 may include information on transmission timing of A/N in response to the PDSCH in the DCI for scheduling each PDSCH. Further, in the case where transmission timings of first A/N and second A/N overlap each other, the transmitting/receiving section 103 may receive at least one of the first A/N and second A/N, using one of an uplink control channel configured for the first A/N and an uplink control channel configured for the second A/N.

Figure 7:
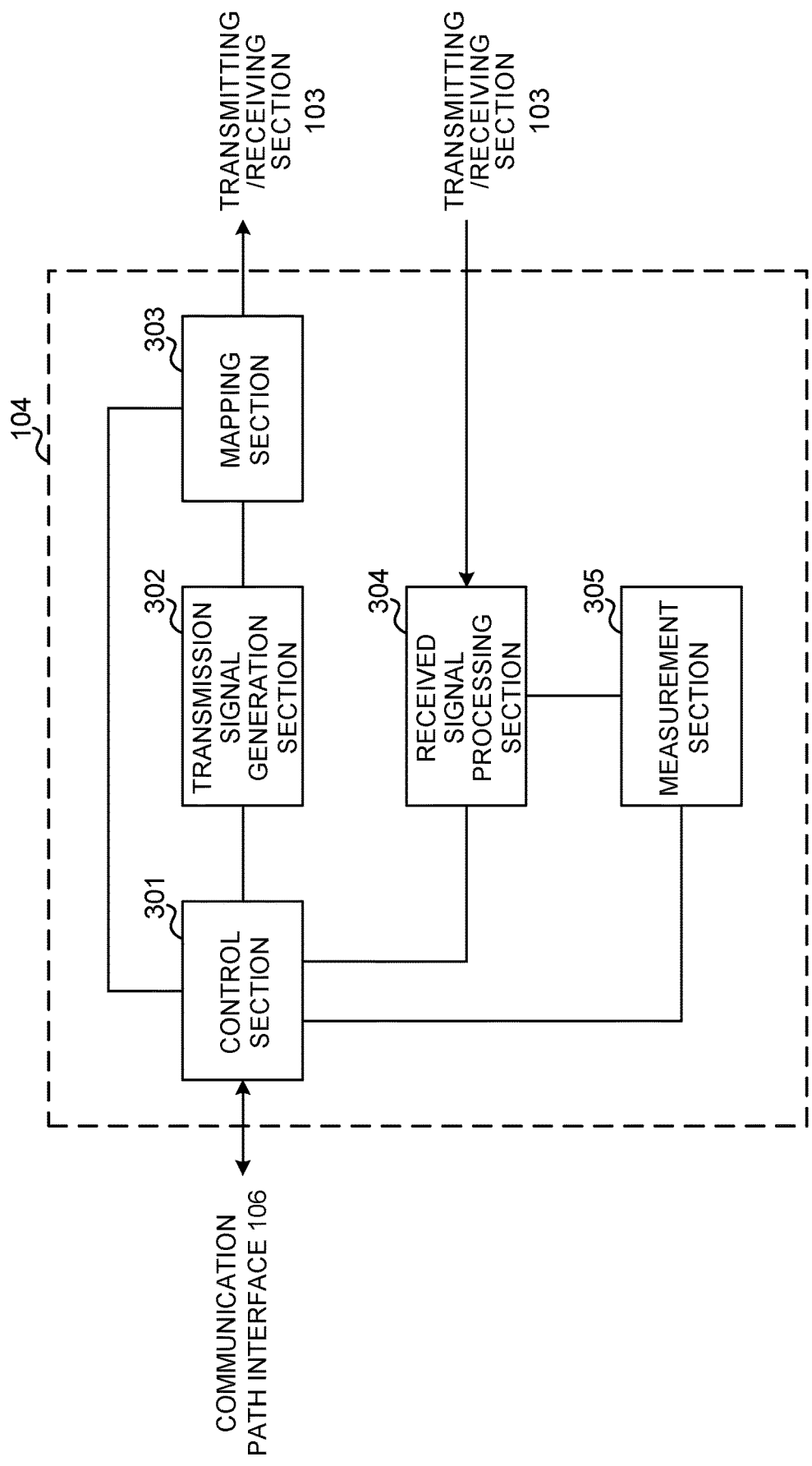
FIG. 7 is a diagram showing one example of a function configuration of the radio base station according to this Embodiment.

FIG. 7 is a diagram showing one example of a function configuration of the radio base station according to one Embodiment of the present invention. In addition, this example mainly illustrates function blocks of a characteristic portion in this Embodiment, and the radio base station 10 may be assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals in the transmission signal generating section 302, allocation of signals in the mapping section 303 and the like. Further, the control section 301 controls reception processing of signals in the received signal processing section 304, measurement of signals in the measurement section 305 and the like.

The control section 301 controls scheduling (e.g., resource allocation) of system information, downlink data signal (e.g., signal transmitted on the PDSCH), and downlink control signal (e.g., signal transmitted on the PDCCH and/or EPDCCH, receipt conformation information, etc.). Further, based on a result obtained by determining the necessity of retransmission control to an uplink data signal, and the like, the control section 301 controls generation of the downlink control signal, downlink data signal and the like. Furthermore, the synchronization signals (e.g., PSS (Primary Synchronization Signal)/SSS (Secondary Synchronization Signal)), downlink reference signals (e.g., CRS, CSI-RS, DMRS) and the like.

Further, the control section 301 controls scheduling of the uplink data signal (e.g., signal transmitted on the PUSCH), uplink control signal (e.g., signal transmitted on the PUCCH and/or PUSCH, delivery acknowledgement signal, etc.), random access preamble (e.g., signal transmitted on the PRACH), uplink reference signal and the like.

The control section 301 controls transmission of a plurality of items of DL data (PDSCHs) with different traffic types (e.g., latency allowable levels of traffic). Further, in the case where transmission of first A/N is indicated at UL timing at which another UL transmission is scheduled, the control section 301 may expect that the UE does not perform feedback of the first A/N.

Moreover, with respect to the PDSCH (e.g., PDSCH #1 without feedback of first A/N in FIG. 4) without feedback of A/N, the control section 301 may expect that the PDSCH is correctly received in the UE, and control retransmission and/or new data transmission. Alternatively, with respect to the PDSCH (e.g., PDSCH #1 without feedback of first A/N in FIG. 4) without feedback of A/N, the control section 301 may expect that the PDSCH is not correctly received in the UE, and control retransmission and/or new data transmission.

Based on instructions from the control section 301, the transmission signal generating section 302 generates downlink signals (downlink control signal, downlink data signal, downlink reference signal, etc.) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates a DL assignment to notify of assignment information of downlink data and/or UL grant to notify of assignment information of uplink data. Each of the DL assignment and UL grant is the DCI and conforms to a DCI format. Further, the downlink data signal is subjected to coding processing and modulation processing, according to a coding rate, modulation scheme and the like determined based on the channel state information (CSI) from each user terminal 20 and the like.

Based on instructions from the control section 301, the mapping section 303 maps the downlink signal generated in the transmission signal generating section 302 to predetermined radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the received signal input from the transmitting/receiving section 103. Herein, for example, the received signal is the uplink signal (uplink control signal, uplink data signal, uplink reference signal, etc.) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs the HARQ-ACK to the control section 301. Further, the received signal processing section 304 outputs the received signal and/or signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, based on the received signal, the measurement section 305 may perform RRM (Radio Resource Management) measurement, CSI (Channel State Information) measurement and the like. The measurement section 305 may measure received power (e.g., RSRP (Reference Signal Received Power)), received quality (e.g., RSRQ (Reference Signal Received Quality), SINR (Signal to Interference plus Noise Ratio), SNR (Signal to Noise Ratio)), signal strength (e.g., RSSI (Received Signal Strength Indicator)), propagation path information (e.g., CSI) and the like. The measurement result may be output to the control section 301.

(User Terminal)

Figure 8:
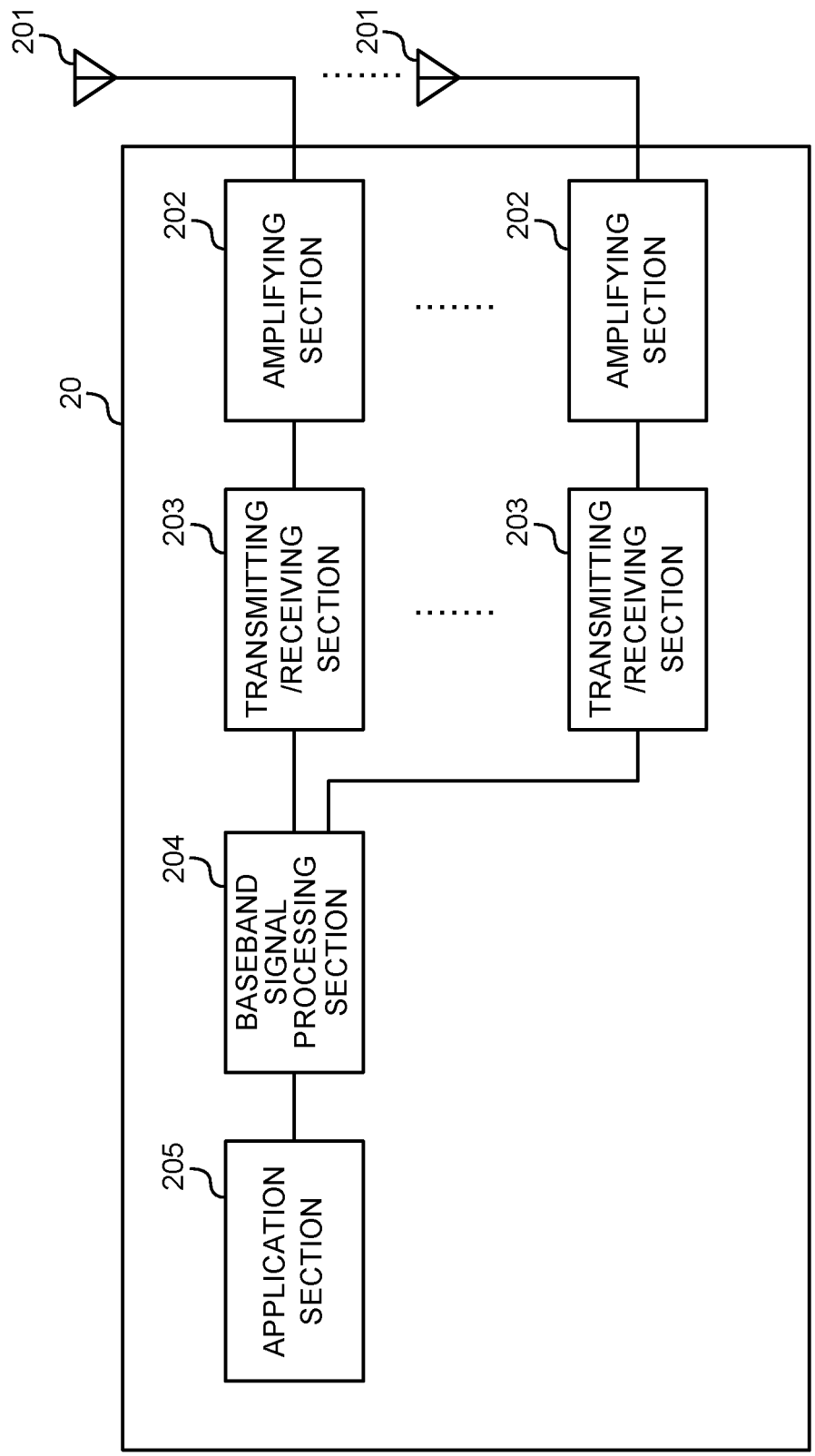
FIG. 8 is a diagram showing one example of an entire configuration of a user terminal according to this Embodiment.

FIG. 8 is a diagram showing one example of an entire configuration of the user terminal according to one Embodiment of the present invention. The user terminal 20 is provided with a plurality of transmitting/receiving antennas 201, amplifying sections 202, transmitting/receiving sections 203, baseband signal processing section 204, and application section 205. In addition, with respect to each of the transmitting/receiving antenna 201, amplifying section 202, and transmitting/receiving section 203, the user terminal may be configured to include at least one or more.

Radio-frequency signals received in the transmitting/receiving antennas 201 are respectively amplified in the amplifying sections 202. Each of the transmitting/receiving sections 203 receives the downlink signal amplified in the amplifying section 202. The transmitting/receiving section 203 performs frequency conversion on the received signal into a baseband signal to output to the baseband signal processing section 204. The transmitting/receiving section 203 is capable of being comprised of a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information may also be transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmitting/receiving sections 203. Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

The transmitting/receiving section 203 receives the DL signal (e.g., downlink control information including the UL transmission instruction (e.g., UL grant) and/or HARQ-ACK transmission instruction, downlink data, etc.). The transmitting/receiving section 203 transmits the UL channel scheduled (or, assigned) the first period later after receiving the DL signal, and predetermined information (e.g., PHR and/or CSI, etc.) using the UL channel.

The transmitting/receiving section 203 receives a plurality of items of DL data (PDSCHs) with different traffic types (e.g., latency allowable levels of traffic). Further, the transmitting/receiving section 203 may receive the information on transmission timing of A/N in response to the PDSCH from the DCI for scheduling each PDSCH. Further, in the case where transmission timings of first A/N and second A/N overlap each other, the transmitting/receiving section 203 may transmit at least one of the first A/N and second A/N, using one of the uplink control channel configured for the first A/N and the uplink control channel configured for the second A/N.

Figure 9:
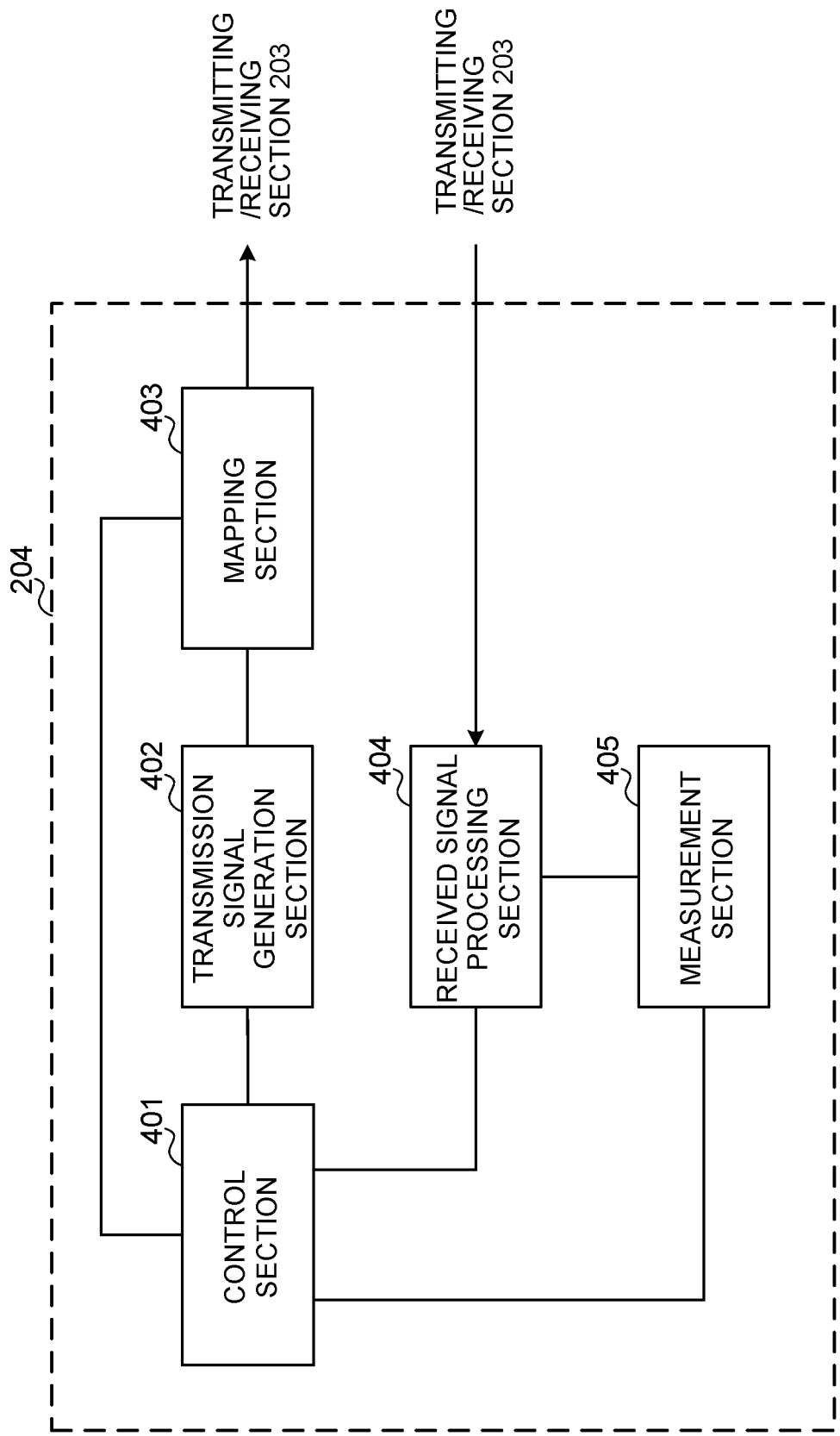
FIG. 9 is a diagram showing one example of a function configuration of the user terminal according to this Embodiment.

FIG. 9 is a diagram showing one example of a function configuration of the user terminal according to one Embodiment of the present invention. In addition, this example mainly illustrates function blocks of a characteristic portion in this Embodiment, and the user terminal 20 may be assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals in the transmission signal generating section 402, allocation of signals in the mapping section 403 and the like. Further, the control section 401 controls reception processing of signals in the received signal processing section 404, measurement of signals in the measurement section 405 and the like.

The control section 401 acquires the downlink control signal and downlink data signal transmitted from the radio base station 10, from the received signal processing section 404. Based on the downlink control signal and/or a result obtained by determining the necessity of retransmission control to the downlink data signal, and the like, the control section 401 controls generation of the uplink control signal and/or uplink data signal.

In the case where transmission timings overlap each other in the first A/N in response to the first PDSCH and the second A/N in response to the second PDSCH transmitted later than the first PDSCH, the control section 401 may control to transmit at least one the first A/N and the second A/N, using one of the uplink control channel configured for the first A/N and the uplink control channel configured for the second A/N.

Further, the control section 401 may control to transmit the first A/N using the uplink control channel configured for the first A/N, while controlling not to transmit the second A/N. Furthermore, in the case where transmission of the first A/N is indicated at UL timing at which another uplink transmission is scheduled, the control section 401 may control not to perform first A/N transmission, while controlling to perform another uplink transmission without changing.

Moreover, the control section 401 may control to receive the first PDSCH that is transmitted without responding to first A/N feedback.

Based on instructions from the control section 401, the transmission signal generating section 402 generates uplink signals (uplink control signal, uplink data signal, uplink reference signal, etc.) to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal about delivery acknowledgement signal, channel state information (CSI) and the like. Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g. demapping, demodulation, decoding, etc.) on the received signal input from the transmitting/receiving section 203. Herein, for example, the received signal is the downlink signal (downlink control signal, downlink data signal, downlink reference signal, etc.) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

The received signal processing section 404 outputs the information decoded by the reception processing to the control section 401. For example, the received signal processing section 404 outputs the broadcast information, system information, RRC signaling, DCI and the like to the control section 401. Further, the received signal processing section 404 outputs the received signal and/or signal subjected to the reception processing to the measurement section 405.

The measurement section 405 performs measurement on the received signal. The measurement section 405 is capable of being comprised of a measurement device, measurement circuit or measurement apparatus explained based on the common recognition in the technical field according to the present invention.

For example, based on the received signal, the measurement section 405 may perform RRM measurement, CSI measurement and the like. The measurement section 405 may measure received power (e.g., RSRP), received quality (e.g., RSRQ, SINR, SNR), signal strength (e.g., RSSI), propagation path information (e.g., CSI) and the like. The measurement result may be output to the control section 401.

(Hardware Configuration)

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized using a single apparatus combined physically and/or logically, or two or more apparatuses that are separated physically and/or logically are connected directly and/or indirectly (e.g., using cable and/or radio), and each function block may be actualized using a plurality of these apparatuses.

Figure 10:
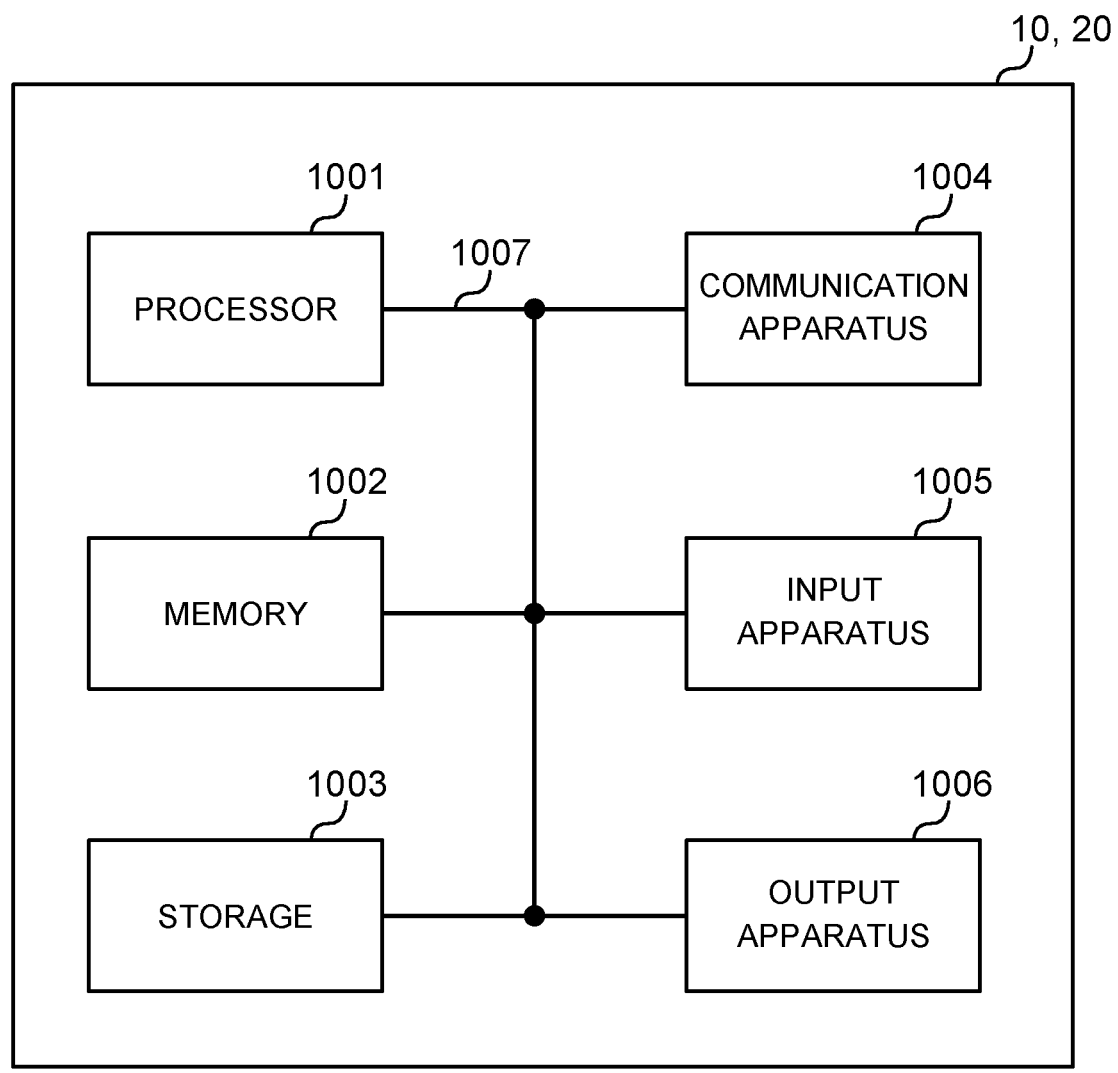
FIG. 10 is a diagram showing one example of hardware configurations of the radio base station and user terminal according to this Embodiment.

For example, each of the radio base station, user terminal and the like in one Embodiment of the present invention may function as a computer that performs the processing of the radio communication method of the invention. FIG. 10 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication vi a the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or a part or the whole of each function block may be actualized using the hardware. For example, the processor 1001 may be implemented using at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may a time unit based on numerology. Moreover, the slot may include a plurality of mini-slots. Each mini-slot may be comprised of one or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel. 8-12), normal TTI, long TTI, ordinary subframe, normal subframe, long subframe or the like. The TTI shorter than the ordinary TTI may be called shortened TTI, short TTI, partial or fractional TTI, shortened subframe, short subframe, mini-slot, subslot or the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subcarrier, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), resource element group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed using an absolute value, may be expressed using a relative value from a predetermined value, or may be expressed using another corresponding information. For example, the radio resource may be indicated by a predetermined index.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiment described in the present Description, and may be performed using another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of predetermined information (e.g., notification of "being X") is not limited to explicit notification, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g., three) cells (also called the sector). When the base station accommodates a plurality of cells, the entire coverage area of the base station is capable of being segmented into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, operation performed by the base station may be performed by an upper node thereof in some case. In a network including one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., looking up in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present Description, in the case where two elements are connected, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the present Description, the terms of "A and B are different" may mean that "A and B are different from each other". The terms of "separate", "coupled" and the like may be similarly interpreted.

In the case of using "including", "comprising" and modifications thereof in the present Description or the scope of the claims, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not provide the invention with any restrictive meaning.

The invention claimed is:

1. A terminal comprising:
a transmitter that transmits a first delivery acknowledgement signal (A/N) in response to a first physical downlink shared channel (PDSCH), and a second A/N in response to a second PDSCH, the first A/N being scheduled by first downlink control information and the second A/N being scheduled by second downlink control information; and
a processor that performs a control, in response to an indication of transmission timing of the first A/N indicating that the transmission timing of the first A/N is in a same slot as the transmission timing of the second A/N, to transmit for the first A/N and for the second A/N a same uplink control channel in the same slot,
wherein the first A/N and the second A/N are transmitted in the same uplink control channel,
the indication of the transmission timing of the first A/N is included in the first downlink control information,
a transmission indication of second A/N is indicated by the second downlink control information at a later timing than a transmission indication of the first A/N that is indicated by the first downlink control information,
the same uplink control channel, on which the first A/N and the second A/N are transmitted, is applied as an uplink control channel for the transmission of the second A/N that is indicated by the second downlink control information at the later timing,
the terminal receives an indication of a transmission timing of a third A/N, indicating that the transmission timing of the third A/N in response to a third PDSCH is in a same slot as the transmission timing of the first A/N, the third A/N being scheduled by third downlink control information, and
in a case where a transmission indication of the third A/N is indicated by the third downlink control information at a later timing than the transmission indication of the first A/N by the first downlink control information, when a priority of the third A/N is lower than a priority of the first A/N, the first A/N is transmitted and the third A/N is not transmitted.

2. A radio communication method in a terminal, comprising:
transmitting a first delivery acknowledgement signal (A/N) in response to a first physical downlink shared channel (PDSCH), and a second A/N in response to a second PDSCH, the first A/N being scheduled by first downlink control information and the second A/N being scheduled by second downlink control information; and
performing a control, in response to an indication of transmission timing of the first A/N indicating that the transmission timing of the first A/N is in a same slot as the transmission timing of the second A/N, to transmit for the first A/N and for the second A/N a same uplink control channel in the same slot, wherein the first A/N and the second A/N are transmitted in the same uplink control channel, the indication of the transmission timing of the first A/N is provided by the first downlink control information, a transmission indication of the second A/N is indicated by the second downlink control information at a later timing than a transmission indication of the first A/N that is indicated by the first downlink control information, the same uplink control channel, on which the first A/N and the second A/N are transmitted, is applied as an uplink control channel for the transmission of the second A/N that is indicated by the second downlink control information at the later timing, the terminal receives an indication of a transmission timing of a third A/N, indicating that the transmission timing of the third A/N in response to a third PDSCH is in a same slot as the transmission timing of the first A/N, the third A/N being scheduled by third downlink control information, and in a case where a transmission indication of the third A/N is indicated by the third downlink control information at a later timing than the transmission indication of the first A/N by the first downlink control information, when a priority of the third A/N is lower than a priority of the first A/N, the first A/N is transmitted and the third A/N is not transmitted.

3. A base station comprising:

a processor that indicates a transmission timing of a first delivery acknowledgement signal (A/N), the processor indicating that the transmission timing of the first A/N in response to a first physical downlink shared channel (PDSCH) is in a same slot as a transmission timing of a second A/N in response to a second PDSCH, the first A/N being scheduled by first downlink control information and the second A/N being scheduled by second downlink control information; and a receiver that, when a reception timing of the first A/N is in a same slot as a reception timing of the second A/N, receives for the first A/N and for the second A/N a same uplink control channel in the same slot, wherein the first A/N and the second A/N are received in the same uplink control channel, the indication of the transmission timing of the first A/N is included in the first downlink control information, a transmission indication of the second A/N is indicated by the second downlink control information at a later timing than a transmission indication of the first A/N that is indicated by the first downlink control information, the same uplink control, on which the first A/N and the second A/N are transmitted, is applied as an uplink control channel for the transmission of the second A/N that is indicated by the second downlink control information the later timing, the base station transmits an indication of a transmission timing of a third A/N, indicating that the transmission timing of the third A/N in response to a third PDSCH is in a same slot as the transmission timing of the first A/N, the third A/N being scheduled by third downlink control information, and in a case where a transmission indication of the third A/N is indicated by the third downlink control information at a later timing than the transmission indication of the first A/N by the first downlink control information, when a priority of the third A/N is lower than a priority of the first A/N, the first A/N is transmitted and the third A/N is not transmitted.

4. A system comprising a terminal and a base station, wherein:

the terminal comprises:

a transmitter that transmits a first delivery acknowledgement signal (A/N) in response to a first physical downlink shared channel (PDSCH), and a second A/N in response to a second PDSCH, the first A/N being scheduled by first downlink control information and the second A/N being scheduled by second downlink control information; and a processor that performs a control, in response to an indication of transmission timing of the first A/N indicating that the transmission timing of the first A/N is in a same slot as the transmission timing of the second A/N, to transmit for the first A/N and for the second A/N a same uplink control channel in the same slot, wherein the first A/N and the second A/N are transmitted in the same uplink control channel, the indication of the transmission timing of the first A/N is included in the first downlink control information, a transmission indication of the second A/N is indicated by the second downlink control information at a later timing than a transmission indication of the first A/N that is indicated by the first downlink control information, the same uplink control channel, on which the first A/N and the second A/N are transmitted, is applied as an uplink control channel for the transmission of the second A/N that is indicated by the second downlink control information at the later timing, the terminal receives an indication of a transmission timing of a third A/N, indicating that the transmission timing of the third A/N in response to a third PDSCH is in a same slot as the transmission timing of the first A/N, the third A/N being scheduled by third downlink control information, and in a case where a transmission indication of the third A/N is indicated by the third downlink control information at a later timing than the transmission indication of the first A/N by the first downlink control information, when a priority of the third A/N is lower than a priority of the first A/N, the first A/N is transmitted and the third A/N is not transmitted, and the base station comprises:

a processor that indicates a transmission timing of the first A/N, the processor indicating that the transmission timing of the first A/N in response to the first PDSCH is in the same slot as the transmission timing of the second A/N in response to the second PDSCH, the first A/N being scheduled by the first downlink control information and the second A/N being scheduled by the second downlink control information; and a receiver that, when a reception timing of the first A/N is in a same slot as a reception timing of the second A/N, receives for the first A/N and for the second A/N the same uplink control channel in the same slot, wherein the first A/N and the second A/N are received in the same uplink control channel.

* * * * *